UNITED STATES PATENT OFFICE 2,619,492

SOLUBLE ONIUM SALTS OF HALOGEN-METHYLATED DIBENZANTHRONYLS

David I. Randall, Easton, Pa., assignor to General Aniline & Film Corporation, New York, N. Y., a corporation of Delaware No Drawing. Application February 10, 1950, Serial No. 143,597

3 Claims. (Cl. 260—363)

This invention relates to the manufacture of new dyestuffs from the halogenmethyl derivatives of compounds of the dibenzanthronyl, dibenzanthrone, and isodibenzanthrone series.

In a co-pending application Serial No. 143,596, filed on February 10, 1950, there are described the halogenmethyl derivatives of members of the dibenzanthronyl, dibenzanthrone, and isodibenzanthrone series. It was pointed out in that application that the halogenmethyl derivatives to some degree have utility as dyes when used in a vatting process, and that these halogenmethyl derivatives have particular utility as intermediates for the preparation of soluble dyes. It is to the preparation of these soluble dyes that this application is directed.

Any halogenmethyl derivative of a dibenzanthronyl, dibenzanthrone, or isodibenzanthrone compound may be converted to a soluble dye by the process of this application, which comprises reacting the halogenmethylated compound with a thiourea compound or a tertiary amine. The reaction proceeds in accordance with one of the following equations:

(1)

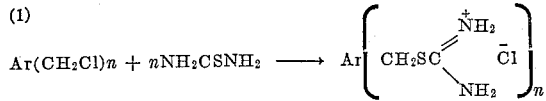

(2)
$$Ar(CH_2Cl)_n + nN(CH_3)_3 \longrightarrow Ar(CH_2\overset{+}{N}(CH_3)_3\overset{-}{Cl})_n$$

wherein Ar is the radical of a dibenzanthronyl, dibenzanthrone, or isodibenzanthrone compound and $n$ is a number from 1 to 3. The thiourea of reaction 1 may be replaced by thiourea derivatives such as 1-allylthiourea, 1-methylthiourea, 1-phenylthiourea, 1,3-dimethylthiourea, 1,3-ethylenethiourea, 1,1,3-trimethylthiourea, and 1,1,3,3-tetramethylthiourea. The trimethyl amine of reaction 2 may be replaced by tertiary amines such as pyridine, picoline, isoquinoline, quinoline, diethylaminoethyl alcohol, triethylamine, and benzyldimethylamine.

The isothiouronium salts of the chlormethylated dibenzanthronyl, dibenzanthrone, and isodibenzanthrone compounds are prepared by heating a mechanically stirred mixture of the chlormethylated dibenzanthronyl, dibenzanthrone, or isodibenzanthrone compound and thiourea or a thiourea derivative under reflux for a period of about one-half hour. The reaction mixture is then diluted with acetone or water, filtered and slurried or washed with acetone. The product is dried by exposure to air. The resulting dyes are water-soluble and are substantive to paper, cotton, silk, nylon, and wool. They may be paste-printed on cotton, silk, and nylon, and developed by vat or acid aging methods well known to the art. The isothiouronium salts of the dibenzanthronyl, dibenzanthrone, and isodibenzanthrone chlormethyl derivatives may be represented by the formula:

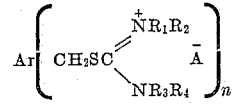

wherein Ar is the radical of a dibenzanthronyl, dibenzanthrone, or isodibenzanthrone compound, $R_1$, $R_2$, $R_3$, and $R_4$ are members of the group consisting of alkyl, alkylene, aryl, and hydrogen, of which $R_2$ and $R_4$ may together form a closed ring system; $n$ is a number from 1 to 3; and A indicates a negative ion, such as chlorine, bromine, or sulfate.

The quaternary salts of the chlormethylated dibenzanthronyl, dibenzanthrone, and isodibenzanthrone compounds are prepared by heating a mixture of the chlormethylated dibenzanthronyl, dibenzanthrone, or isodibenzanthrone with a tertiary amine e. g. trimethylamine pyridine. After heating for several hours the reaction mixture is diluted with acetone, filtered, and washed with acetone until the tertiary amine odor has been removed. The resulting dye is readily soluble in water. The resulting quaternary salts of the chlormethylated dibenzanthronyls, dibenzanthrones, and isodibenzanthrones may be represented by the following formulae:

(1)

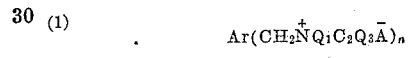

(2)

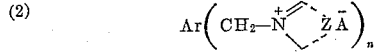

wherein Ar has the same meaning as above; $Q_1$, $Q_2$, and $Q_3$ are members of the group consisting of alkyl, alkylol, and alkaryl; Z indicates the C atoms necessary to complete a 6-membered ring system; A and $n$ have the same meanings as above. Print dyeings may be made from these quaternary salts of the chlormethylated dibenzanthronyls, dibenzanthrones, and isodibenzanthrones in the same manner as in the case of the isothiouronium salts of the said chlormethylated compounds and will dye directly from aqueous solutions. Although the quaternary salts are less fast to light than the isothiouronium salts, the former nevertheless are fast to chlorine and washing. Both the isothiouronium and quaternary salts have also shown utility as bactericides, fungicides, and insecticides.

Of the isothiouronium salts of the chlormethylated dibenzanthronyl, dibenzanthrone, and isodibenzanthrone compounds, those which are derived from trimethyl- and tetramethylthiourea are preferred, and to insure sufficient solubility the halogenmethylated dibenzanthronyl, dibenzanthrone, or isodibenzanthrone compound should contain an average of at least one halogenmethyl group per molecule. Bright shades having excellent fastness to chlorine, washing, and light are obtained when printing these isothiouronium salts of the chlormethylated dibenzanthronyl, dibenzanthrone, and isodibenzanthrone compounds.

As starting materials for the production of the isothiouronium and quaternary salts, the class of chlormethylated dibenzanthronyl, dibenzanthrone, and isodibenzanthrone compounds described in application Serial No. 143,596, filed on February 10, 1950, may be employed. This class includes dibenzanthronyl, dibenzanthrone, isodibenzanthrone and such compounds containing nuclear substituents such as halogen substituents, and in addition at least one halomethyl group per molecule. Mono- and dichlormethyl derivatives of the dibenzanthronyl, dibenzanthrone, and isodibenzanthrone compounds are most commonly obtained by the process of application Serial No. 143,596, filed on February 10, 1950. However, the product of the chlormethylation process may contain an average of one chlormethyl group or a fraction of from 1 to 3 chlormethyl groups, and such products may be readily converted to the isothiouronium and quaternary salts by the process of this application.

The following examples will serve to further illustrate the invention, but it is not intended that they should be considered as limitations on the scope of the invention. Unless otherwise stated, the parts are by weight.

EXAMPLE 1

*The 1,1,3-trimethylisothiouronium salt of dichloromethyldibenzanthrone (Violanthrone)*

A mechanically stirred mixture of 6 gr. of dichloromethyldibenzanthrone, 6 gr. of 1,1,3-trimethylthiourea, and 35 ml. of water was heated under reflux (101–102° C.) for 30 minutes. The resulting solution was cooled to 40–50° C. and then poured into 200 ml. of acetone. The precipitated solid was collected on a filter, washed with acetone, and dried. 6 gr. of a brown product were obtained. An aqueous solution of this material dyes cotton in violet shades of good fastness to light. The product has the formula:

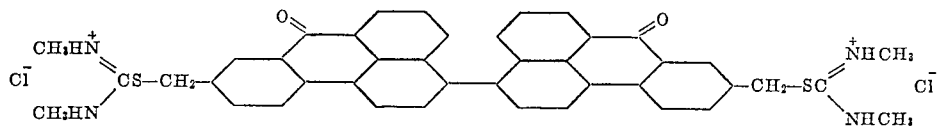

EXAMPLE 2

*The 1,3-dimethylisothiouronium salt of dichloromethyl-3,3'-dibenzanthronyl*

A mechanically stirred mixture of 5.5 gr. of dichloromethyldibenzanthronyl, 18.7 gr. of 1,3-dimethylthiourea, and 35 ml. of water was heated under reflux (101–102° C.) for 30 minutes. The resulting solution was cooled to 40–50° C. and then poured into 200 ml. of acetone. The precipitated solid was collected on a filter, washed with acetone, and dried. 3.7 gr. of a yellow product were obtained. This product prints cotton in bright yellow shades from an aqueous solution. The product has the formula:

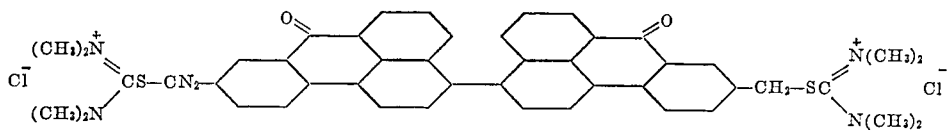

EXAMPLE 3

*The 1,1,3,3-tetramethylisothiouronium salt of dichloromethyl-3,3'-dibenzanthronyl*

A mixture of 2.8 gr. of dichloromethyl-3,3'-dibenzanthronyl and 12 gr. of 1,1,3,3-tetramethylthiourea was heated at 110° C. for 10 minutes. The yellow isothiouronium salt was isolated by pouring the reaction mixture into acetone, filtering, washing with acetone, and drying. 4.3 gr. of a yellow solid product, which dyes cotton bright yellow shades from aqueous soluton, were obtained.

A mixture of 60% of this dye and 40% of Alcian Blue prints cotton in bright green shades with improved fastness to light and washing as compared with the Alcian Blue. The product has the formula:

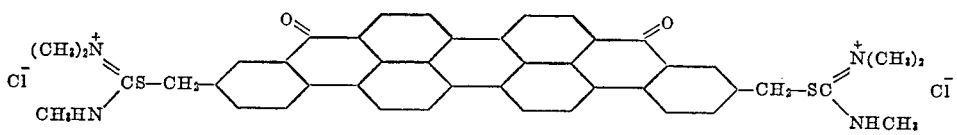

EXAMPLE 4

*The trimethylammonium salt of dichloromethyl-4,4'-dibenzanthronyl (C. A. 4,4'-Bi-7H-benz-[de]anthracen-7-one (CH₂Cl)₂)*

Into an autoclave equipped with an agitator, a thermometer, and a pressure gauge was placed 23.5 grams of dichloromethyl-4,4'-dibenzanthronyl and 46.0 grams of trimethylamine dissolved in 410 grams of absolute ethanol. The reaction mixture was heated at 115–120° C. (pressure equals 80 p. s. i.) for 3 hours. On cooling, the mixture was filtered to remove any insoluble material (discarded). The yellow filtrate was concentrated on a steam bath under reduced pressure and upon dilution with acetone the product was precipitated in 80% yield. This dye prints cotton in yellow shades. The product has the formula:

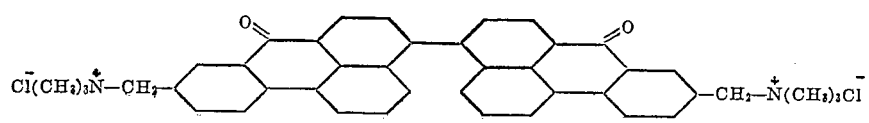

EXAMPLE 5

*The 1,1,3-trimethylisothiouronium salt of chloromethylisobenzanthrone*

A reaction mixture consisting of 30 g. of chloromethylisodibenzanthrone, 30 gr. of 1,1,3-trimethylthiourea, and 120 ml. of water was heated under reflux (101–102° C.) for 30 minutes. The resulting solution was cooled to 40–50° C. and then poured into 200 ml. of acetone. The precipitated solid was collected on a filter, washed with acetone, and dried. The yield was 23 gr. of a product which prints cotton in dull violet shades of excellent light fastness from an aqueous solution. The product has the formula:

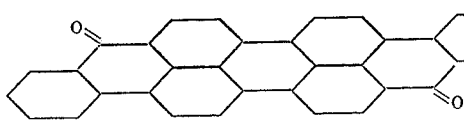

EXAMPLE 6

*The 1,1,3-trimethylisothiouronium salt of dichloromethylisodibenzanthrone*

A reaction mixture of 15 gr. of dichloromethylisodibenzanthrone, 20 gr. of 1,1,3-trimethylthiourea, and 42 ml. of water was heated under reflux (110–102° C.) for 30 minutes. The resulting solution was cooled to 40–50° C. and then poured into 200 ml. of acetone. The precipitated solid was collected in a filter, washed with acetone, and dried. 16.2 gr. of the product were obtained. The product has the formula:

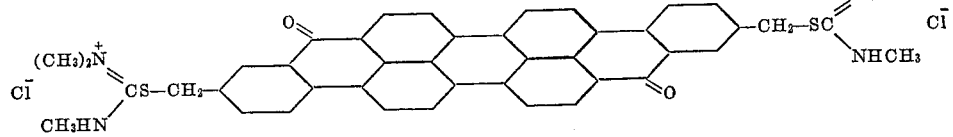

EXAMPLE 7

*The pyridinium salt of dichloromethylisodibenzanthrone*

11.5 gr. of dichloromethylisodibenzanthrone and 200 ml. of pyridine are heated in an autoclave at 150° C. for 1½ hours. The reaction mixture is filtered and washed with acetone. The yield is 12.7 gr. of the resulting pyridinium salt. This dye prints cotton in bright violet shades and has bactericidal, fungicidal, and insecticidal properties. The product has the formula:

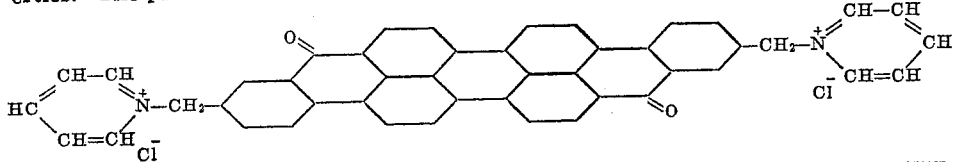

I claim:

1. The soluble onium salts of halogenmethyl derivatives of vat dyes of the class consisting of those having the formulae:

(1) $Ar\left[CH_2SC\begin{matrix}\overset{+}{N}R_1R_2\\NR_3R_4\end{matrix}\bar{A}\right]_n$ (2) $Ar(CH_2\overset{+}{N}Q_1Q_2Q_3\bar{A})_n$ (3) $Ar\left(CH_2-\overset{+}{N}\diagup\diagdown Z\bar{A}\right)_n$ wherein Ar is a dibenzanthronyl radical selected from the group consisting of the following structural configurations:

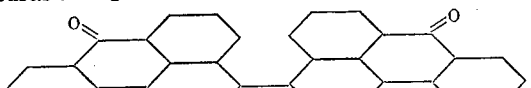

and

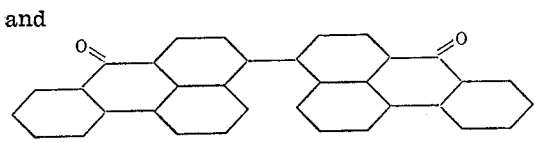

$R_1$, $R_2$, $R_3$, and $R_4$ are members of the group consisting of alkyl, alkylene, aryl, and hydrogen, of which $R_2$ and $R_4$ may together form a closed ring system; $Q_1$, $Q_2$, and $Q_3$ are members of the group consisting of alkyl, alkylol, and alkaryl; Z indicates the C atoms necessary to complete a 6-membered ring system; $\bar{A}$ indicates a negative ion; and $n$ is a number from 1 to 3.

2. The isothiouronium salt of dichloromethyl-3,3'-dibenzanthronyl having the formula:

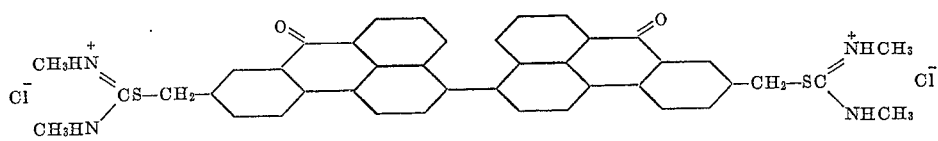

3. The isothiouronium salt of dichloromethyl-3,3'-dibenzanthronyl having the formula:

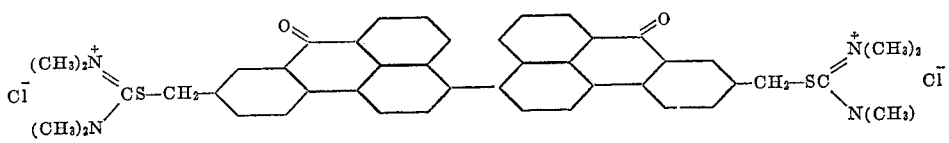

DAVID I. RANDALL.

(References on following page)

References Cited

The following references are of record in the file of this patent:

UNITED STATES PATENTS

| Number | Name | Date |
|---|---|---|
| 2,189,397 | Harris | Feb. 6, 1940 |
| 2,189,720 | Watt | Feb. 6, 1940 |
| 2,302,885 | Orthner | Nov. 24, 1942 |
| 2,544,825 | Coffey et al. | Mar. 13, 1951 |

FOREIGN PATENTS

| Number | Country | Date |
|---|---|---|
| 613,980 | Great Britain | Dec. 7, 1948 |
| 623,998 | Great Britain | May 26, 1949 |

OTHER REFERENCES

Taylor et al., "Sidgwicks Organic Chemistry of Nitrogen," page 27, 1945, Oxford at the Clarendon Press.